United States Patent [19]
Ramsay et al.

[11] 3,800,893
[45] Apr. 2, 1974

[54] WEIGHING APPARATUS AND METHOD

[75] Inventors: Joseph D. Ramsay, Woodbury; George R. Weaver, Moorestown, both of N.J.

[73] Assignee: Campbell Soup Company, Camden, N.J.

[22] Filed: Sept. 5, 1972

[21] Appl. No.: 286,104

[52] U.S. Cl............. 177/25, 177/1, 177/164, 177/184, 177/52, 177/196, 177/210, 177/212, 235/151.33, 73/141 A, 73/141 R, 73/67.2
[51] Int. Cl............................................. G01g 3/14
[58] Field of Search.............. 177/1, 16, 18, 25, 50, 177/28, 121, 150, 164, 165, 190–192, 194–199, 201, 202, 210, 211, 212–214, 225, 245, 146, 253, 255; 235/150.25, 150.51, 150.33; 73/67, 67.2, 70.1, 70.2, 141 A, 141 R

[56] References Cited
UNITED STATES PATENTS

| | | | |
|---|---|---|---|
| 2,489,899 | 11/1943 | Kniazuk et al. | 177/161 |
| 3,545,555 | 12/1970 | Cass | 177/210 |
| 3,276,525 | 10/1966 | Cass | 177/1 |
| 3,519,093 | 7/1970 | Ramsay | 177/210 X |
| 3,443,653 | 5/1969 | Marshall | 177/255 X |
| 3,371,731 | 3/1968 | Connors et al. | 177/225 |
| 3,492,858 | 2/1970 | Heflinger et al. | 177/1 |
| 3,561,553 | 2/1971 | Blubaugh | 177/255 |
| 3,237,449 | 3/1966 | Brandt | 73/141 R |
| 3,620,069 | 11/1971 | Cole, Jr. | 73/67.2 |
| 2,714,310 | 11/1959 | Bahrs | 177/210 |

FOREIGN PATENTS OR APPLICATIONS

| | | | |
|---|---|---|---|
| 1,278,496 | 10/1961 | France | 177/246 |
| 1,243,334 | 8/1971 | Great Britain | 177/246 |
| 663,934 | 5/1963 | Canada | 177/246 |

Primary Examiner—Stephen J. Tomsky
Assistant Examiner—Vit W. Miska
Attorney, Agent, or Firm—Howson and Howson; Albert L. Free

[57] ABSTRACT

High-speed weighing of a train of objects on a delivery belt is accomplished by delivering the objects in sequence to a weighing position on a spring-mounted platform, which responds by executing an oscillatory motion characteristic of the weight of the object; this motion is sensed and signals representative of the instantaneous displacement, of the velocity, and of the acceleration of the platform are produced and used in a computing circuit to compute the weight of the particular object from the second-order differential equation of its motion on the platform. Integrating means are preferably utilized to discriminate against interfering noise in the output signal of the computing means, and the final output signal may be utilized to operate an indicator or an actuator for diverting or marking overweight or underweight objects. Timing of the weighings of the successive objects is controlled by an object-sensing device which provides indications of when each object is in its weighing position. The spring arrangement supporting the weighing platform is preferably of a torsionally-resilient beam balance type utilizing crossed leaf-spring pivots to provide the spring restraint. The computing means preferaly provides implicit solution of the differential equation of motion, and utilizes an algorithm which facilitates adjustment of the computing circuit.

25 Claims, 16 Drawing Figures

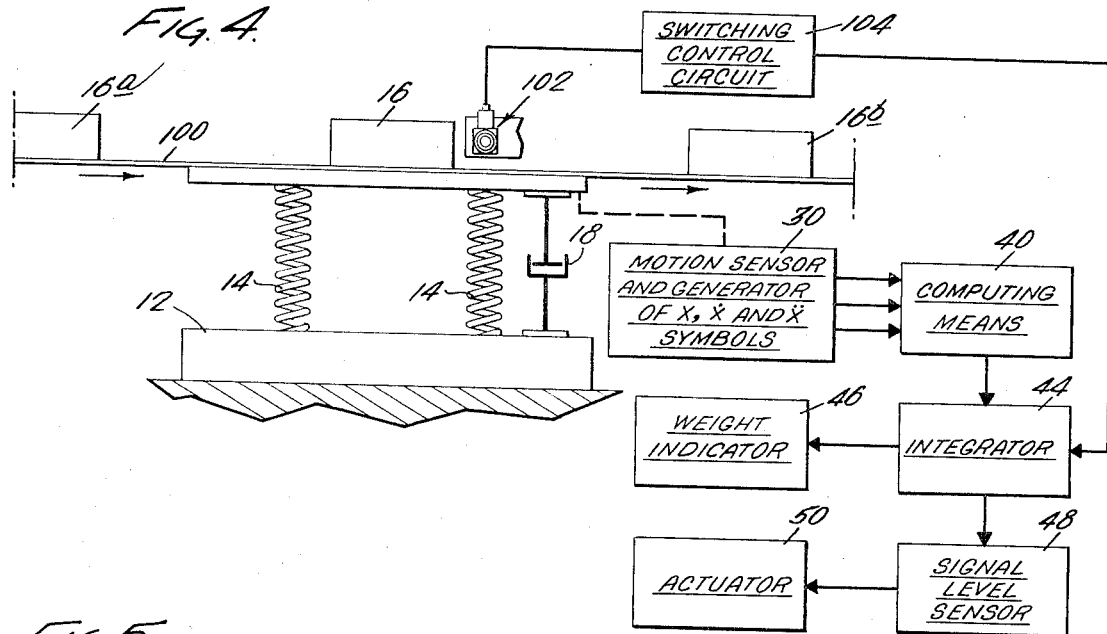
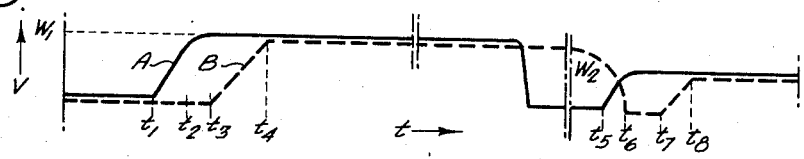
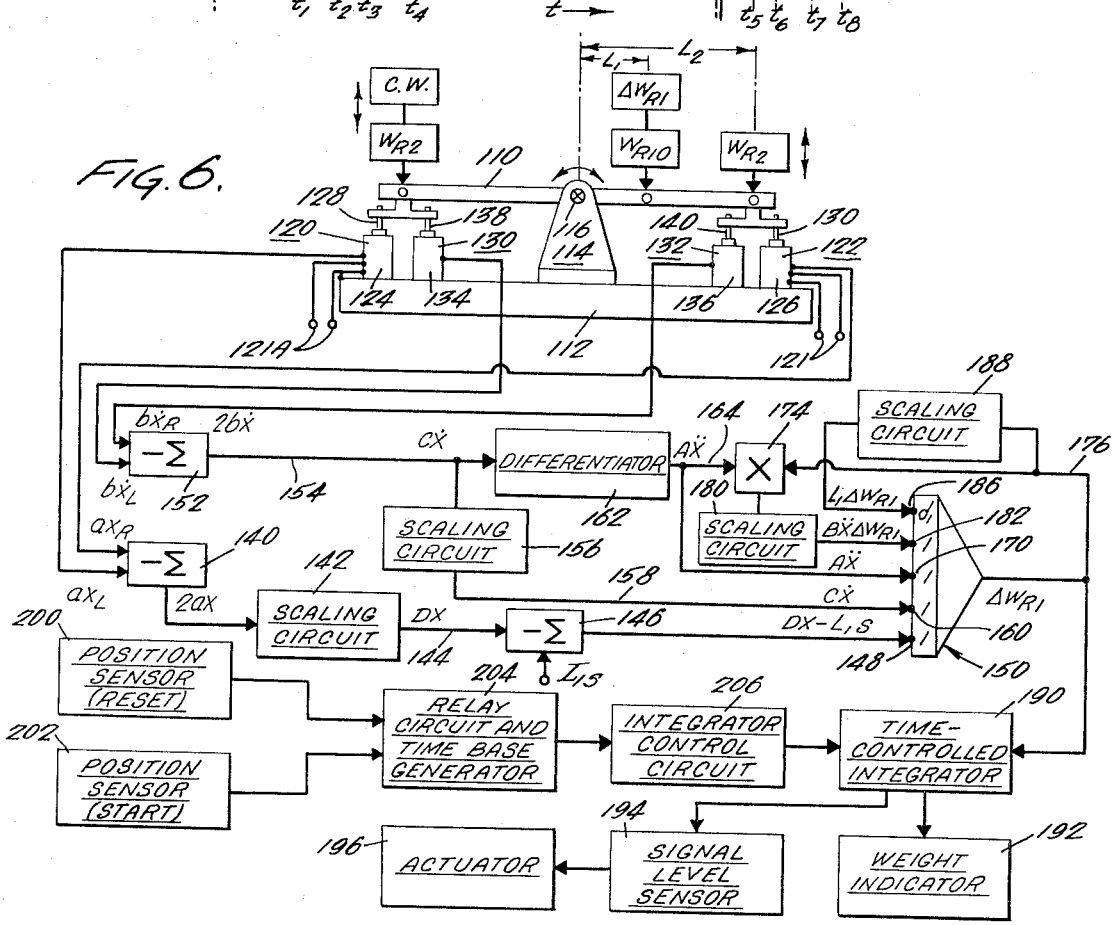

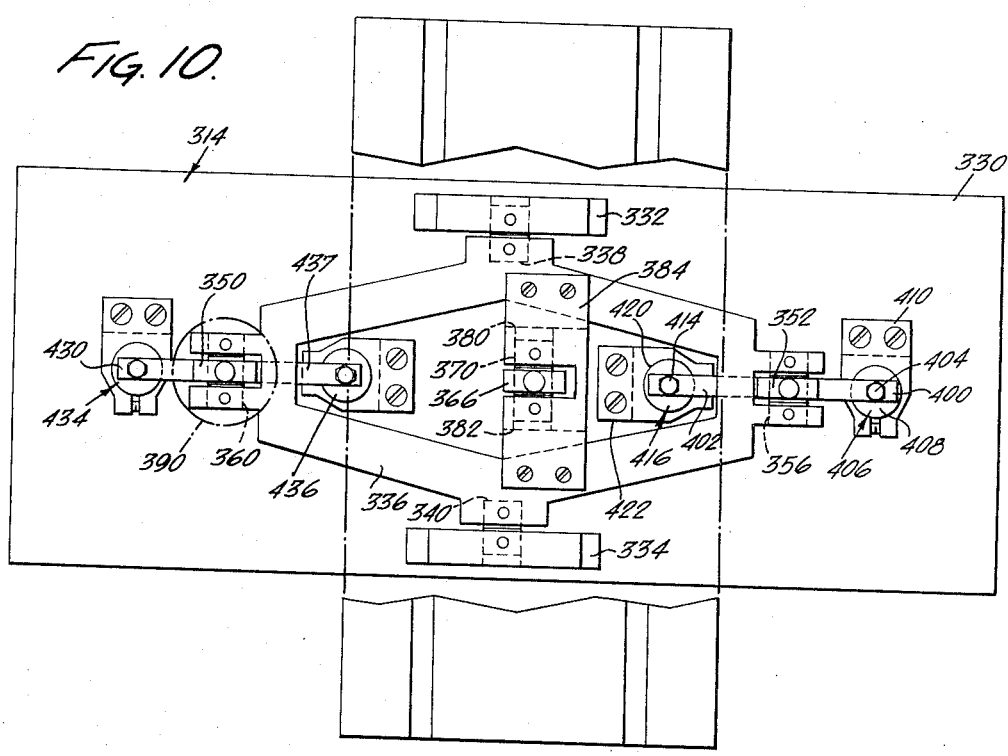
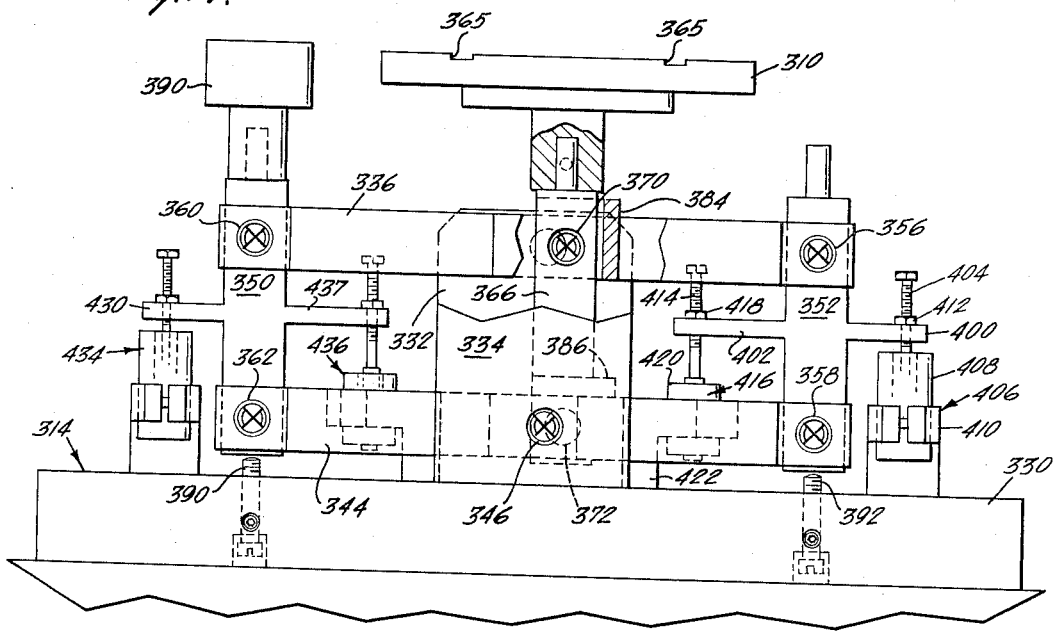

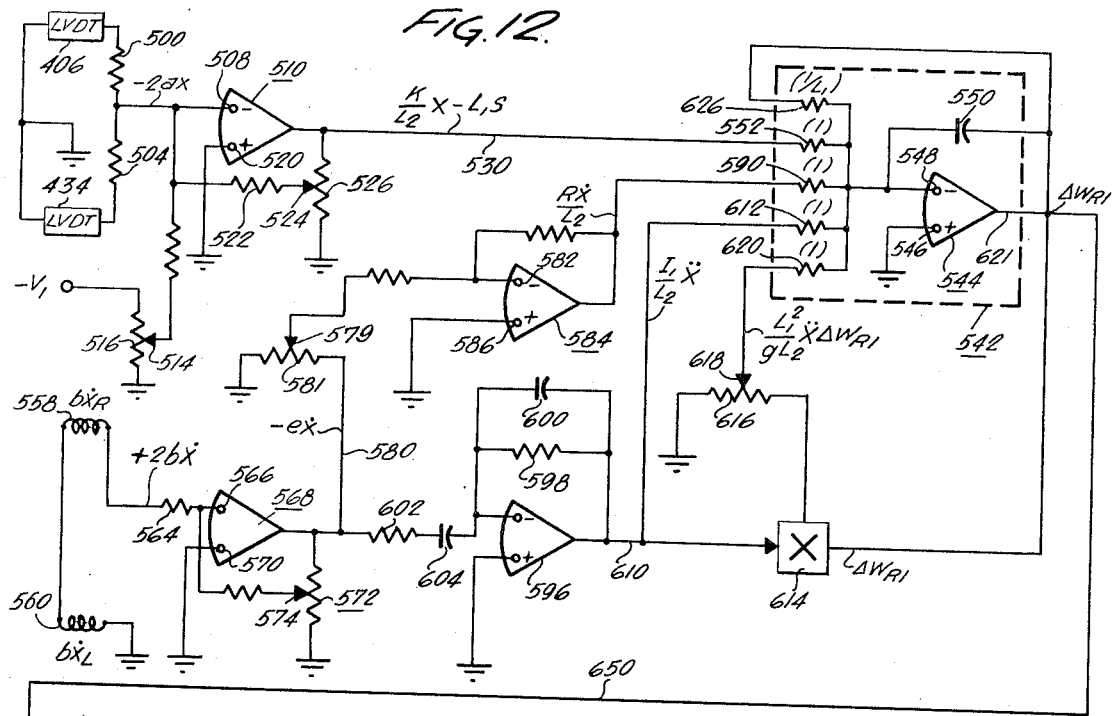
FIG. 12.
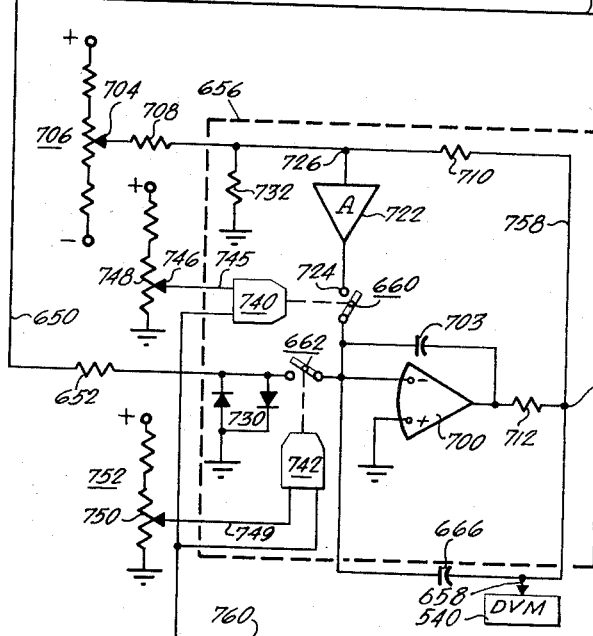
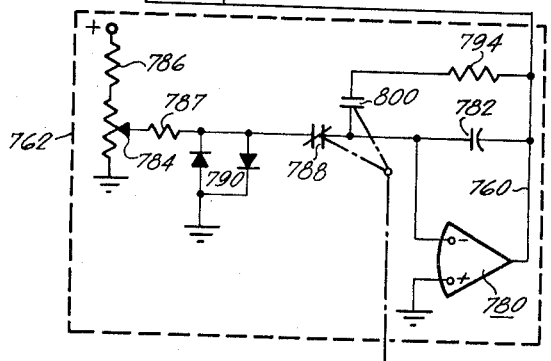
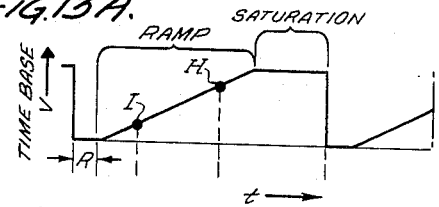
FIG. 13A.
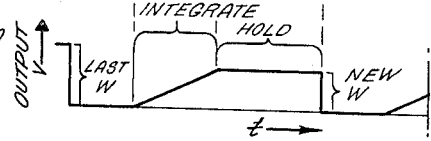
FIG. 13B.
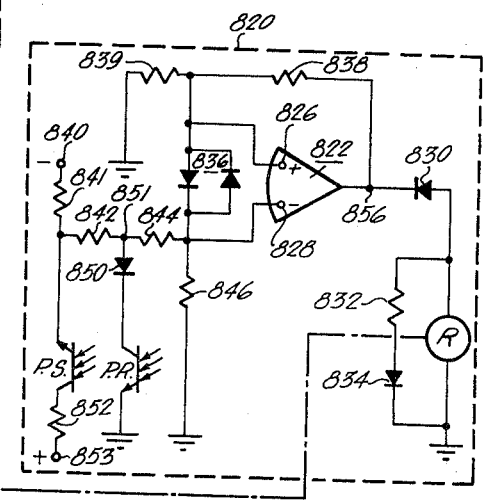

WEIGHING APPARATUS AND METHOD

BACKGROUND OF THE INVENTION

Resilient or spring-type weighing devices of many types have long been known in the prior art. In a simple form, a weight is supported on the spring and the extent of deflection of the spring utilized as an indication of weight. When speed of weighing is not a factor, such arrangement can be satisfactory. However, when high-speed weighing is desired, the difficulty arises that the resonant mechanical system formed by the spring and the weight which is supports results in initial oscillations of the spring each time a weight is added to it for weighing purposes, and until these oscillations have substantially died out the true steady-state deflections of the spring due to the weight is not easily determined. The time required for the oscillation to die out is in turn determined by the extent of damping of the mechanically resonant circuit. If a large amount of damping is employed, the number of oscillations executed before reaching a steady-state position is reduced. However, such a high degree of damping greatly increases the time required for the spring to change from one final deflection position to another, and accordingly merely increasing the damping does not provide for the desired high-speed weighing.

Another proposed method of high-speed weighing permits the spring and its weight to oscillate relatively rapidly with low damping and measures the frequency of the oscillations to provide an indication of weight, as for example in U.S. Pat. No. 3,519,093 of J.D. Ramsay, issued July 7, 1970. In addition to some complications in implementation of such methods, the method is not suited to accomplishing weighing of an object in a time short compared with one cycle of the resonant oscillations.

Accordingly, it is an object of the invention to provide a new and improved method and apparatus for the weighing of objects.

Another object is to provide such method and apparatus particularly suitable for high-speed weighing.

Another object is to provide such a method and apparatus utilizing spring support of the object to be weighed, in which the measurement of weight may be accomplished in substantially less than one complete cycle of oscillation of the object.

It is also an object to provide a system in which a train of objects is moved at high-speed across a spring-mounted weighing platform to accomplish weighing of each object individually with a high degree of accuracy and reliability and in a very short period of time.

Another object is to provide an arrangement for computing weight of an object from signals representative of the displacement, velocity and acceleration of a resonant mechanical system of which it is a part, and which is relatively simple to construct and operate.

SUMMARY OF THE INVENTION

These and other objects of the invention are achieved by providing a spring-mounted support means for receiving an object to be weighed, whereby the support means is caused to execute an oscillatory motion in response to the addition of the weight of the object to the support means; means are also provided which respond to that oscillatory motion to produce three signals — a first signal representative of the displacement of the support means, a second signal representative of the velocity of the support means, and a third signal representative of the acceleration of the support means, during the oscillatory motion; computing means are also provided which respond to the first, second and third signals to solve the second-order differential equation of motion of the support means to produce an output signal representative of the weight of the object.

More particularly, a mechanically-resonant system, when out of equilibrium, will execute a motion given by a second-order differential equation of motion involving the instantaneous displacement of the weight supported by the system, the first and second derivatives with respect to time of that displacement, and certain constants characteristic of the resonant assembly, e.g. the effective spring-constant of the system, the effective damping constant of the system, and the value of the acceleration of gravity at the site. The weight of an object which is a part of the resonant system can therefore be determined by sensing the motion of the weight or the spring during the period of initial transient oscillatory motion, producing signals representative of the instantaneous displacement and of the first and second derivatives thereof, and, in a suitable computing means, combining these signals to produce an output signal which represents the true weight of the object.

Furthermore, since the instantaneous displacement and first and second derivatives thereof can be sensed within a fraction of one cycle of oscillation of the system, weighing can be accomplished in a time short compared with one cycle. In theory, the weighing time can in fact be made infinitesimally small, limited only by the accuracy of the instruments employed and by unavoidable interfering "noise" signals from electrical or mechanical sources. It has been found, for example, that accurate and reliable weighing can be accomplished within less than a quarter-cycle of the oscillatory motion of the weighing system. Accordingly, a train of objects can be weighed in sequence at a very high rate. By using the preferred algorithm and a computer circuit for solving it implicitly as described hereinafter, advantages in simplicity are realized.

BRIEF DESCRIPTION OF FIGURES

These and other objects and features of the invention will be more readily understood from a consideration of the following detailed description, taken in connection with the accompanying drawings, in which:

FIG. 4 is a schematic diagram illustrating one general form of system for accomplishing automatic weighing of a series of objects in accordance with the invention;

FIG. 5 is a further graphical representation to which reference will be made in explaining the operation of the invention;

FIG. 6 is a schematic diagram illustrating a preferred form of the invention;

FIGS. 10 and 11 are, respectively, a plan view and an elevation view, with parts broken away, of a preferred form of the mechanical portion of the weigher of FIG. 7;

FIG. 12 is an electrical schematic diagram of a preferred form of the electrical portion of a system suitable for use with the apparatus of FIG. 7; and FIGS. 13A and 13B are graphical representations to which reference will be made in describing the operation of a system embodying the invention.

DETAILED DESCRIPTION OF SPECIFIC EMBODIMENTS

Figure 1:
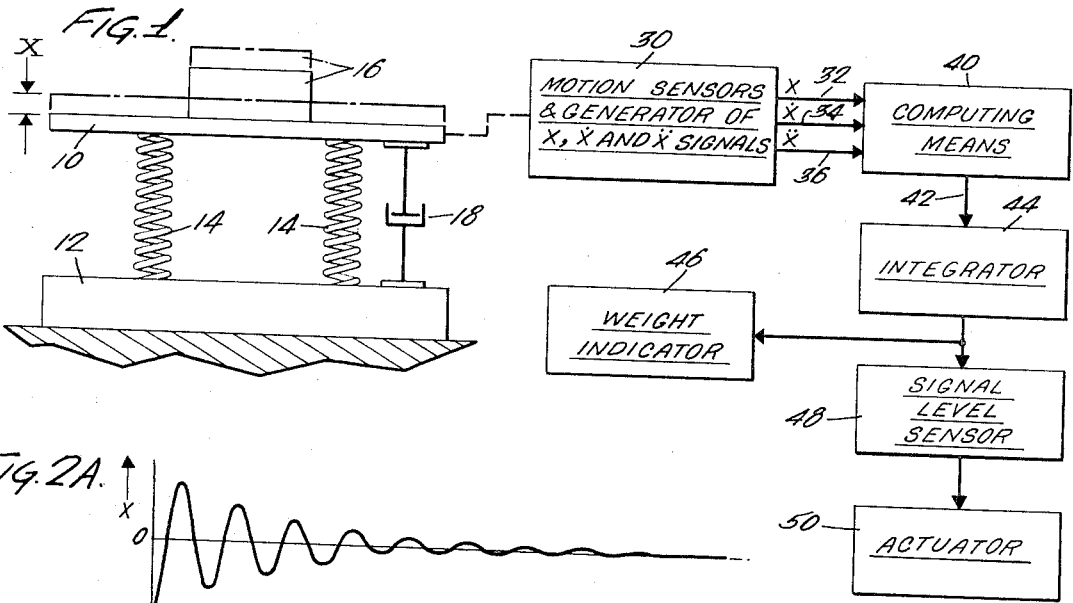
FIG. 1 is a schematic diagram illustrating, in simplified form, one embodiment of the invention.

Referring now, by way of example only, to FIG. 1 in which an elementary, simplified form of the invention is schematically shown, a weighing platform 10 is positioned horizontally and spring-mounted on a fixed base 12 by means of a spring assembly 14 represented in this case by a set of coil springs, so that when an object such as 16 is placed thereon for weighing, the system will initially execute transient oscillations which eventually die out, leaving the springs compressed and the platform 10 lowered in proportion to the weight of the object 16. The dotted upward extension of the object 16 indicates the position of its top when it is first placed on the platform, before the platform has moved from its reference equilibrium position with no object located on it. The deflection of the spring in response to the weight of the object is indicated by $x$ in FIG. 1.

Figure 2A:
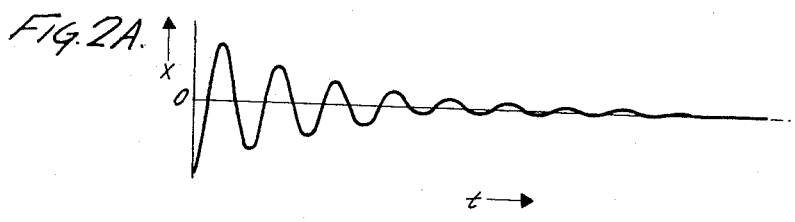
FIGS. 2(A), 2(B) and 2(C) comprise a group of graphical representations to which reference will be made in explaining the operation of the invention.

FIG. 2(A) is a graphical plot in which ordinates represents the vertical deflection of the spring and platform from the reference equilibrium position thereof in the absence of any object thereon, and abscissae represent time. In FIG. 2(A), it is assumed that at time zero the empty platform has been pushed downward, and is thereafter permitted to move freely. Its vertical motion will then be substantially sinusoidal with time about the zero reference position as shown in the FIG. 2A, the oscillations gradually decreasing in amplitude until the platform is again at rest at its zero reference position. The rate at which the oscillations die down is determined by the damping of the mechanically resonant system. In this case, such damping is represented schematically by the dash-pot 18, which in some cases may actually be a dash-pot device, but in other cases merely corresponds to energy losses in the system due to friction or windage or in some cases due to inherent energy losses in the springs themselves.

Figure 2B:
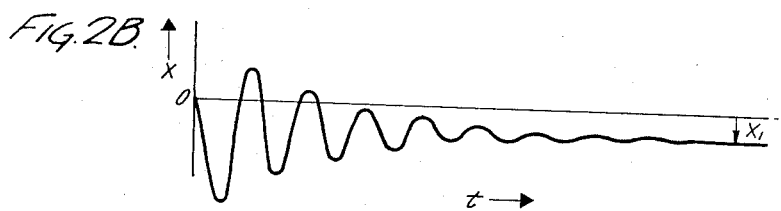
Figure 2C:
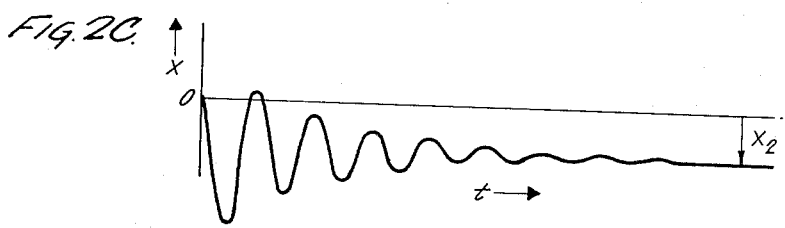

Referring now to FIG. 2(B), in which the coordinates are of the same nature and scale as in FIG. 2(A), the graph in this case represents the vertical position of the platform 10 following a time zero at which the object 16 is placed thereon in weighing position. In this case, the alternate compressions and expansions of the spring again cause the platform to execute vertical oscillations of gradually-decaying magnitude until the platform arrives at a final steady-state position $X_1$ which in this case is below the zero reference level. Assuming that the final compressed position of the spring is within its elastic limit, the final steady-state platform displacement in FIG. 2(B) is proportional to the weight of the object 16, and is therefore a measure of weight. For example, referring to FIG. 2(C), a graph having coordinates like those of FIG. 2(B) is shown which differs in that it is assumed that the object 16 has a somewhat greater weight, so that when the initial transient oscillations of the platform die down, the final rest position $X_2$ of the platform is further below the reference level than in FIG. 2(B), to an extent proportional to the increased weight of the object in this case. Such a weighing procedure is of a type well known in the prior art.

However, it is noted that many cycles of oscillations occur before the platform reaches its new final state in response to the presence of the object to be weighed, which means that an accurate weight measurement is not possible for a relatively long period of time. With lighter damping, many more cycles and a much longer time will elapse before the oscillations die out. For high-speed weighing, it would be desirable to accomplish the weighing in a much shorter time, for example in a time short compared with one cycle of the oscillation, or even short compared with a quarter-cycle of the oscillation.

In accordance with the invention, weighing is accomplished before the oscillations die down by sensing the instantaneous displacement $x$ of the platform as well as the first and second derivatives thereof with respect to time, and solving the second-order differential equation of motion of the platform to obtain a signal representing the weight of the object on the platform. More particularly, the differential equation of motion for the spring-mounted platform (and therefore for the object and the upper end of the springs) is given by the following equation:

$$(M + M_o)(d^2x/dt^2) + R(dx/dt) + KX + (M + M_o)g = 0$$

where M is the mass of the object to be weighed, $M_o$ is the combined mass of all other parts of the mechanically-resonant system including the platform, R is the damping constant of the entire mechanically-resonant circuit, K is the effective spring-constant of the spring assembly and g is the acceleration of gravity at the weighing site.

Rearrangement of this last equation to solve it for the object weight $Mg$ gives the following relation:

$$Mg = g\,[(R\,dx/dt + K\,X/-(d^2x/dt^2 + g) - M_0]$$

For any given system, the constants $R$, $K$ and $M_0$ are readily determined. As an example, the constant $K$ can be determined by deflecting the spring system by measured amounts and measuring the magnitudes of the restoring forces thereby generated, $K$ being the restoring force per unit of spring deflection $x$. The damping constant $R$ may be determined by setting the system into resonant oscillations, measuring the time required for the oscillations to decay from their initial amplitude to $1/e$ of their original amplitude, and calculating $R$ from this measurement in known manner. $M_0$ can be determined by calculation or weighing of parts. The value of $g$ is a known constant for any given location.

In the embodiment of the invention shown in FIG. 1, three signals are generated which are representative, respectively, of the instantaneous vertical displacement $x$ of the platform 10 and the first and second derivatives thereof. This is accomplished by means of the motion sensors and generator of $x$, $\dot{x}$ and $\ddot{x}$ signals 30. Various types of mechanically, electrically, or capacitively-coupled sensors are known in the art which will respond to the motion of the platform to produce the designated signals. If desired, only the displacement is directly sensed, and the first and second derivatives produced therefrom by electronic circuitry for accomplishing the necessary single and double differentiation to produce the first and second derivatives; or, the displacement and velocity can both be directly sensed, and the second derivative can be produced therefrom electronically; other combinations of direct sensing and signal manipulation may be utilized to produce the desired displacement signal and the first and second derivative signals on lines 32, 34 and 36 respectively of FIG. 1. The latter three signals are supplied to computing means 40, which combines the above-mentioned three signals according to the last equation above, so as to produce on output line 42 thereof a true weight-indicating signal. To discriminate against electrically or mechanically induced noise in the weight-indicating signal this signal may be passed through integrator 44 or some other form of noise-filtering device. Where the highest speed of weighing and the greatest accuracy are both desired, such a noise discriminating circuit is desirable.

The output signal of integrator 44 may be applied to a weight indicator 46, which may for example be an analog or digital voltmeter when the signal supplied thereto is in electrical form. It may also be applied to a signal level sensor 48 which senses whether the level of the output signal is within or without a predetermined range of values and operates an actuator 50 accordingly. For example, if the weight of object 16 is below a predetermined level, the actuator 50 may be used to segregate the object as non-standard, or to mark it, for example; in particular, where a train of objects to be sequentially weighed is passed along a belt in series, the actuator may be utilized to divert from the train any which fail to meet the predetermined weight standard, or to divert objects of different weights into different bins.

In the system of FIG. 1, the entire system may be essentially electrical in nature, or essentially mechanical in nature, or any combination of the two which is desired, and may include any desired combination of analog and digital components.

It will be appreciated that since the apparatus and method described with reference to FIGS. 1 and 2 does not require measurement of frequency of oscillation, and does not require waiting until oscillations are damped out, but instead merely relies upon the determination of displacement and its first and second derivatives during any short interval in the oscillations, the measurement does not require one or many cycles of oscillation to take place; instead, the measurement may, for example, be accomplished within less than a quarter-cycle of the oscillation, and hence in a very short time.

Figure 3:
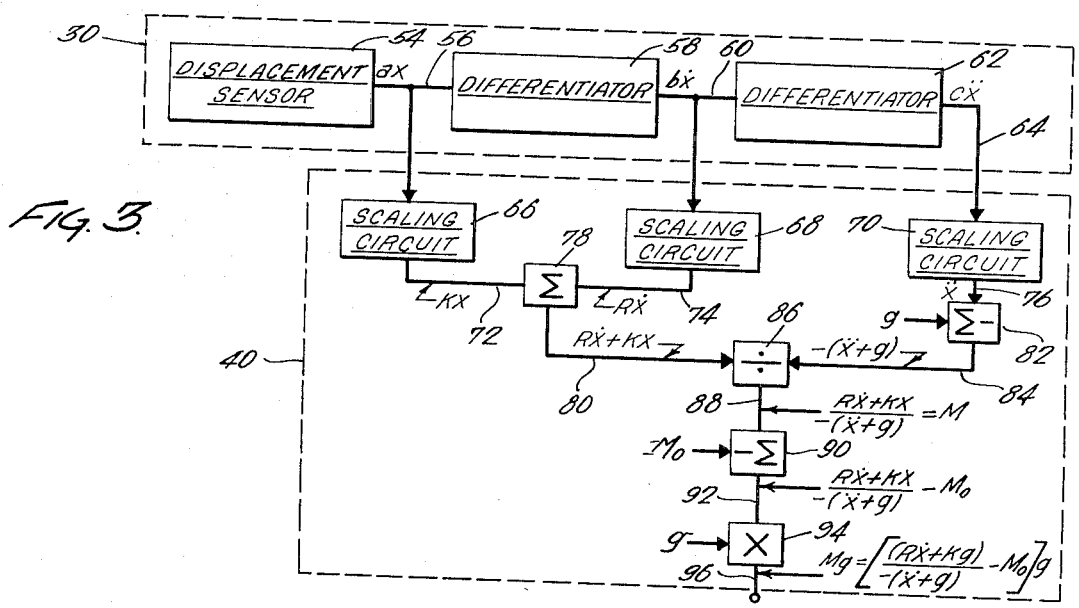
FIG. 3 is a block diagram illustrating one form of computing means suitable for use in the weighing system of FIG. 1.

FIG. 3 illustrates one manner in which the motion sensors and generators of $x$, $\dot{x}$ and $\ddot{x}$ signals 30 and the computing means 40 may be embodied. A conventional displacement sensor 54, which may be of commercially available form, produces an output signal on line 56 proportional to the instantaneous vertical displacement of the weighing platform 10 from its unweighted position in response to the weight of mass 16. This signal, designated as $ax$, is applied to a differentiator 58, which may be a standard electronic differentiator, to produce on its output line 60 a signal proportional to the first derivative of displacement, i.e., the velocity, which may be represented as $b\dot{x}$. The latter signal is supplied to another differentiator 62, which may again be of conventional electronic form, to produce on output line 64 a signal proportional to the second derivative of displacement and designated as $c\ddot{x}$.

The displacement signal, the first derivative signal, and the second derivative signal from the block 30 are supplied, respectively, to scaling circuit 66, scaling circuit 68 and scaling circuit 70. The scaling circuits may be conventional electronic circuits for providing a predetermined gain, so as to adjust the proportionality factor of the signal supplied thereto to a desired value; for example, each may provide any desired amplification greater than one and/or a suitable voltage-divider arrangement providing a desired fraction of the signal applied thereto. In this example the scaling is such that the signals on leads 72, 74 and 76 represent, respectively, $Kx$, $R\dot{x}$ and $\ddot{x}$, where $K$ is the effective spring constant and $R$ the damping factor of the spring support weighing platform. The signals on lead 72 and 74 are additively combined in signal adder 78 to produce on line 80 a signal representing $R\dot{x} + Kx$.

The $\ddot{x}$ signal on lead 76 is passed through an adder and inverter 82, the other input of which is supplied with a signal proportional to the value of the acceleration of gravity $g$, to produce on output line 84 a signal corresponding to $-(\ddot{x} + g)$.

The signals on lines 80 and 84 are supplied to a conventional dividing circuit 86 to produce on output lead 88 thereof a signal representing the fraction $(R\dot{x} + kx)/-(\ddot{x} + g)$. The latter signal is passed through the subtractor 90, the other subtractor input of which is supplied with a voltage proportional to $M_0$, the mass of the mechanically resonant system in the absence of any external weight, thereby to form on output lead 92 a signal representing $[(R\dot{x}+kx)/-(\ddot{x}+g)] - M_0$. The latter signal is multiplied by the factor $g$ in conventional multiplier 94 to produce the final signal representing $$g\left[\frac{R\dot{x}+Kx}{-(\ddot{x}+g)} - M_0\right]$$

on the output line 96. The latter signal on the line 96 represents the weight of the object added to the platform, and may be supplied to the integrator 44 in FIG. 1, for example.

While the embodiment of the computer means described with reference to FIG. 3 can be made to operate, using standard components, it is preferred to utilize the type of circuit illustrated in FIGS. 6 and 12 and described in detail hereinafter. which does not require the use of a signal divider, which is more noise immune, and which is easier to calibrate and to adjust for proper scaling values.

FIG. 4 illustrates schematically an application of the type of circuit of FIG. 1 to the weighing of each of a train of rapidly moving objects. Corresponding parts in FIGS. 1 and 4 are indicated by corresponding numerals. FIG. 4 differs from FIG. 1 in showing a train of objects consisting of object 16, an earlier object 16b and a later object 16a, all carried successively through a weighing position on platform 10 by means of a suitable moving support 100, such as a chain or belt for example; it further differs in the provision of a position sensor 102 for producing signals indicative of the arrival of the object at its weighing position, and in the provision of a switching control circuit 104 supplied with signals from the position sensor and effective to start the operation of the integrator at a selected time in the weighing of each object and to return the integrator to its reference condition prior to the weighing of the next object.

We have found that accurate weighing of the given object in a train may be accomplished in accordance with the invention without waiting for the oscillations of the platform to die down between weighings of successive objects, and without forcing the platform to return to a reference position between weighings. Position sensor 102 senses when each object has reached a position such that it is fully on the weighing platform 10 and, after a further brief settling interval, then actuates the integrator 44 to integrate the output of computing means 40 for a predetermined brief time interval and produce an integrated output signal for operation of the weight indicator 46 or the actuator 50, for example.

FIG. 5 is a graph in which ordinates represent voltage and abscissae represent time, showing the output of the computing means 40 in solid line A and showing the output of the integrator 44 in broken-line B. Here it is assumed that at time $t_1$ an object such as 16 first reaches the platform 10, and at a time $t_2$ the object is fully on the platform and a brief settling period has passed as indicated by the actuation of the position sensor 102 by the leading edge of the object 16. A short time thereafter, at time $t_3$, the integrator is automatically turned on, and after a further predetermined time interval the integrator is turned off at time $t_4$ and its output voltage level held constant until the next object reaches the weighing position. The object 16 is of course entirely on the platform 10 until a time after $t_4$.

As shown in curve A, the output of the computing means 40 rises rapidly to a level $W_1$ indicative of the weight of the object 16. Throughout the interval $t_3$ to $t_4$ this output is substantially constant, except for some unavoidable minor variations due to interference and the like. At time $t_3$, the integrator output shown in curve B begins to rise at a rate determined by the weight $W_1$ and at time $t_4$ reaches a level indicative of the weight $W_1$; at this time $t_4$, the integration action is terminated and a holding period initiated during which the integrator output remains constant.

At the later time $t_5$, the object 16a of lesser weight $W_2$ has been delivered into weighing position on platform 10, and the computing means again rapidly produces an output indicative of the weight $W_2$ thereof, as shown in FIG. 5. At the time $t_6$ the position sensor 102 operates switching control circuit 104 to terminate the holding level of the output of the integrator 44 and return it to its reference condition. A short time later at time $t_7$ the integrator is again started, charges up at a rate determined by $W_2$, and is turned off at time $t_8$, the integration interval $t_7$–$t_8$ being the same as the previous integration interval $t_3$–$t_4$. The integrator output is then at the level marked $W_2$ and is held at this level until the next object arrives. This sequence of operations is repeated for subsequent objects.

While the level of the output signal from the computing means 40 is indicative of the weight of the object being weighed, the hold-level output of the integrator 44 produces an output which is in effect the time average of the output of the computer means over a relatively brief period of integration, thereby to eliminate to a large extent the effects of minor variations in the output of the computing means 40 due to interfering signals.

It is emphasized that the time between $t_4$ and $t_7$, i.e., the time between successive operations of the integrator circuit, may be short compared to the time required for the oscillations of the mechanically-resonant weighing platform to die down, and the rate at which objects may be weighed successively may therefore be made very short; for example, more than 600 objects per minute may be weighed in this manner, which is one object for each one-tenth second, even though the damping of the mechanically resonant system is so light that it would require many seconds for oscillations to die down to a negligible value.

FIG. 6 shows generally and schematically one preferred embodiment of the invention, in more detail than in FIG. 4. In the example of FIG. 6, there is represented schematically a generally horizontal balance beam 110 mounted from a fixed base plate 112 by means of a support 114 and a torsionally-resilient spring means 116 which provides a linear spring restoring force on the beam when it is displaced angularly about an axis normal to the plane of the paper through the center of the spring means. The weights $W_{R2}$ shown acting downwardly at opposite ends of the beam represent the effective weight of the unloaded beam structure, the right-hand weight $W_{R2}$ representing the effective weight of the right half of the beam structure in producing a clockwise moment, and the weight $W_{R2}$ at the left representing the effective weight of the left half of the beam structure in producing a counterclockwise moment, their moments being equal in the present case because the beam is symmetrical about the spring axis. The two effective beam weights $W_{R2}$ are positioned at equal radii $L_2$ from the spring axis.

The weight $W_{R10}$ represents the weight of the platform for receiving the mass to be weighed, and the weight $\Delta W_{R1}$ represents the mass to be weighed on that platform. The platform is assumed to be pivotally supported on the beam so as to move only along the vertical direction in response to movement of the beam about its spring axis.

A counterweight C.W. is also supported at the left end of the beam by a suitable pivot arrangement so that the counterweight moves only along a vertical direction upon tilting of the beam. Although not necessary in all cases, in this preferred example the counterweight is chosen so that, when a calibrating weight equal to the standard weight of the objects to be weighed is placed on the weighing platform, the beam is horizontal and the spring means 116 substantially unstressed; for example if the objects are expected to weight about 1 pound, the counterweight is selected to balance the beam with a 1 pound standard weight on the platform.

Also provided are a vertical displacement sensor 120 for sensing the instantaneous value of vertical displacement of the left end of the beam 110, and another vertical displacement sensor 122 for sensing the instantaneous value of the vertical displacement of the right end of the beam 110. Sensor 120 comprises a stator 124 which is fixed to the base 112 and includes oscillator and demodulator elements to furnish the displacement voltage; appropriate supply voltages for the latter devices are supplied by way of supply leads 121a. Sensor 120 comprises a movable member 128 pivotally supported on the beam at a distance $L_2$ to the left of the spring axis so as to move in the vertical direction in response to tilting of the beam 110. Sensor 122 comprises a stator 126 fixed to the base 112 and includes oscillator and demodulator elements to furnish the displacement voltage; and a movable member 130 pivotally supported on the beam at a distance $L_2$ to the right of the spring axis so as to move vertically in response to tilting of the right end of the beam 110, and supply voltage for the circuitry inside the stator 126 is provided over leads 121.

Also provided are the left-end velocity sensor 130 and the right-end velocity sensor 132, having respective stator elements 134 and 136 mounted on the base 112 and vertically-moving members 138 and 140, respectively, pivotally supported by the ends of the beam at the distance $L_2$ from the spring axis to sense the vertical velocity of the left and right ends of the beam 110.

The basic second-order differential equation for the angular motion of the beam and the masses supported by it, about the axis of spring 116, is given by the following equation (1):

$$I\ddot{\theta} + L_1(W_{R10} + \Delta W_{R1}) + L_2(W_{R2} - W_{R2} - \text{C.W.}) + R\dot{\theta} + K\theta = 0 \tag{1}$$

where $I$ is the moment of interia of the beam 110 and all elements supported thereon; $\theta$ is the instantaneous angular displacement of the beam from its rest position with a standard value of $\Delta W_{R1}$ on the weighing platform; $\dot{\theta}$ is the first derivative $d\theta/dt$ of the angular displacement with respect to time; $\ddot{\theta}$ is the second derivative $d^2\theta/dt^2$ of angular displacement with respect to time; $R$ is the damping factor of the mechanically-resonant system comprising the beam 110, the elements supported by it, and the spring means 116; and $K$ is the spring constant of the spring means acting on beam 110.

For small angles of oscillation of the beam about the spring axis, the vertical linear motion of the ends of the beam is related to the angular motion of the beam as follows:

vertical displacement $x = L_2\theta$
vertical velocity $\dot{x} = L_2\dot{\theta}$
vertical acceleration $\ddot{x} = L_2\ddot{\theta}$ \hfill (2)

Also, to balance the beam pulse the platform weight $W_{R10}$ plus a standard weight S on the platform, $$\text{C.W.} = (L_1/L_2)(W_{R10} + S) \tag{3}$$

Further, $I$ equals the moment of inertia $I_1$ of the beam system without $\Delta W_{R1}$, plus the added moment of inertia $I_2$ due to $\Delta W_{R1}$, i.e., $$I = I_1 + I_2 \tag{4}$$

While there are a number of ways in which $I_1$ can be determined, one method is to measure the period of natural oscillation of the beam plus counterweight and platform, with and without known different weights on the platform in place of $\Delta W_{R1}$, and to compute $I_1$ from these data. More particularly, it is known in general that the moment of inertia is proportional to the square of the period P of natural oscillation of the resonant system. That is, $$I = \Sigma m_i r_i^2 + m_c L_1^2 = k P^2,$$

where $m_c$ is the mass of the added calibrating weights and $m_i r_i^2$ represents the moments of all other mass elements of the rotating structure (which remain constant during the measurement procedure).

Accordingly, $$dI = L_1^2 dm_c = k d(P^2),$$

where $d$ represents small increments due to the calibrating weights.

Therefore $$1/k = d(P^2)/L_1^2 dm_c$$

Since $L_1$ is known for any given apparatus, $1/k$ can be computed by dividing the change in $P^2$ by $L_1$ times the change in calibrating mass producing the change in $P^2$. When $1/k$ is thus determined, $k$ is also determined, and $I_1$ is determined from $I = k P^2$ for the case of the balance system with zero weight $\Delta W_{R1}$ on the platform.

The additional moment of inertia $I_2$ due to weight $\Delta W_{R1}$ is $(L_1^2/g)\Delta W_{R1}$, so that $$I = I_1 + (L_1^2/g)\Delta W_{R1}. \tag{5}$$

Substituting equations (2), (3) (5) into equation (1) then gives:

$$(I_1\ddot{x}/L_2) + (L_1^2/L_2g)\Delta W_{R1}\ddot{x} + L_1(W_{R10} + \Delta W_{R1}) - L_1(W_{R10} + S) + (R/L_2)\dot{x} + (K/L_2)x = 0.$$

or $$(I_1/L_2)\ddot{x} + (L_1^2/L_2g)\Delta W_{R1}\ddot{x} + L_1\Delta W_{R1} - L_1 S + (R/L_2)\dot{x} + (K/L_2)x, = 0 \tag{6}$$

Equation (6) may be written as:

$$(A\ddot{x}) + (B \Delta W_{R1}\ddot{x}) + (C\dot{x}) + (Dx - L_1 S) + (L_1\Delta W_{R1}) = 0 \tag{7}$$

where
$A = I_1/L_2$
$B = L_1^2/L_2 g$
$C = R/L_2$
$D = K/L_2$
$L_1 =$ moment arm of platform from spring axis
$S =$ offset weight required on platform to balance beam. For a given apparatus and weighing procedure, A through D, $L_1$ and S are all constants, known or determinable as described hereinbefore.

The apparatus of FIG. 6 operates to solve equation (7) for the weight $\Delta W_{R1}$ placed on the weighing platform by forming separate signals representing the terms in the five sets of parentheses in equation (7) and applying them as separate inputs to a high-gain summing integrator acting as an implicit resolver to produce an output signal representative of the value of $\Delta W_{R1}$, the weight of the object to be weighed on the platform. In general, the $\ddot{x}$, $\dot{x}$ and $x$ signals are derived from the sensors previously described, known types of scaling circuits are utilized to provide the desired values of the known constant coefficients in equation (7), and a subtractor is utilized to form the term $Dx-L_1S$ in equation (7). Wherever $\Delta W_{R1}$ appears in the equation, it is provided in the circuit by feeding back into the appropriate point the output of the summing integrator representing $\Delta W_{R1}$.

More particularly, the displacement signal $ax$ from the left-end sensor stator 124 is applied to one input of subtractor 140, and the displacement signal $ax_R$ from the right-end sensor 126 is applied to the other input of the subtractor 140. Due to the symmetry of the weighing structure, $x_R$ is equal and opposite to $x_L$, and therefore the output of subtractor 140 may be represented as $2ax$. Because of the differential combining of the signals from the two displacement sensors, vibrations transmitted by the support 112 to the beam 110 and tending to move the opposite ends of the beam in the same direction are cancelled out in the subtractor 140. The effects of such undesired interfering vibrations occuring during the weighing of an object are further reduced by the previously-described provision of an offset to the beam balance, provided by the counterweight C.W. equal to the standard value of the object to be weighed. In the absence of such an offset, vibrations transmitted to the beam balance point during weighing will produce a tendency for the beam to turn angularly due to its unbalanced condition; however, with the beam substantially in balance during weighing due to the use of the counterweight offset, such interfering vibrations tend to affect both sides of the beam equally, with little or no resultant tendency toward turning of the beam.

The output of subtractor 140 is next passed through the scaling circuits 142 which provides an amount of gain such that the output therefrom on line 144 accurately represents the quantity $Dx$ in equation (7) above. The latter signal is then passed through a subtractor 146, the other input of which is supplied with a constant signal so scaled as to equal the value $L_1S$, whereby the output of subtractor 146 represents the term $Dx - L_1S$ in equation (7). This signal is supplied to input terminal 148 of the high-gain summing integrator 150.

At the same time, the output signal $b\dot{x}_R$ from the stator of right-hand velocity sensor 132 is supplied to one input terminal of subtractor 152, while the corresponding output from the velocity sensor 134, represented as $b\dot{x}_L$, is supplied to the other input of subtractor 152. For reasons described previously with respect to the displacement sensors, the output of the subtractor 152 may be represented as $2b\dot{x}$, the differential connection serving to cancel out effects of vibrations acting equally and in the same direction on the two ends of the beam. The subtractor output on line 154 is passed through scaling circuit 156 which provides suitable gain (greater or less than 1) so that the signal on its output line 158 represents $C\dot{x}$, one of the terms in equation (7) above, and is supplied to input terminal 160 of the integrator 150.

The signal on lead 154 is also passed through the differentiator 162, which produces on its output lead 164 a signal varying with the rate of change of the input signal thereto, and hence as the second derivative $\ddot{x}$ of the displacement; differentiator 162 preferably includes suitable scaling or dividing circuits so that the signal on lead 164 represents the term $A\ddot{x}$ in equation (7) above, and is supplied to input terminal 170 of the integrator 150.

The output of the differentiator 162 is also supplied to the multiplying circuit 174, the other input of which is supplied with the output of signal of the integrator 150 appearing on output line 176 thereof. When the output of the integrator 150 represents $\Delta W_{R1}$, the output of the multiplier 174 is proportional to the product $\Delta W_{R1}\ddot{x}$. The latter output, after passing through the scaling circuit 180, represents the term $B\ddot{x} \Delta W_{R1}$ in equation (7) above, and is supplied to input 182 of integrator 150.

The output of integrator 150 is also fed back to its input terminal 186 by way of a scaling circuit 188 which effectively adjusts the level thereof so that the signal at input terminal 186 equals $L_1\Delta W_{R1}$ as expressed in the last term of equation (7) above.

It will be appreciated from a review of equation (7) that the values of all of the constants therein can be multiplied or divided by any given factor so long as the same multiplication or division is performed on all the constant factors, without effecting the validity of the solution for $\Delta W_{R1}$ obtained from the equation. Accordingly, it is not necessary that the five signals applied to the inputs of integrator 150 represent the actual numerical values of the terms in any particular set of units, or in any known units at all, so long as the constants in the equation are in the proper relative proportions with respect to each other.

The output of integrator 150 on line 176 is forced to assume the value $\Delta W_{R1}$, which value is fed back to the multiplier 174 and to the scaling circuit 188, to cause all of the input signals to the integrator 150 to correspond to the terms of equation (7) above. This method has been termed "implicit solution" of the equation, as opposed to explicit solution in which the equation would be solved mathematically for $\Delta W_{R1}$ as in the embodiment of FIG. 3 hereof and the terms of that solution formed and combined by the computing means. The present method is somewhat analogous to substituting different values of $\Delta W_{R1}$ into equation (7) until the equation is satisfied, at which time the substituted value will be the correct one.

The output of integrator 150 is supplied to the time controlled integrator 190 which provides, in effect, an averaging operation aiding in the reduction of rapid fluctuations in the signal in line 176 due to interfering vibrations and the like. The output of the time-controlled integrator 190 may again be applied to a suitable weight indicator 192, such as a digital voltmeter, and through a suitable signal level sensor 194 to an actuator 196 so as to operate the actuator when the signal is within or without a predetermined range for the values.

As described in more detail in connection with FIG. 12, the turning on and off of integrator 190 is enabled by the reset position sensor 200 and the start position sensor 202 located along the platform, the location and details and operation of which will be described more fully in connection with later figures. In brief, when the object to be weighed reaches a predetermined position on the platform, the reset position sensor 200 delivers a signal to the relay circuit and time base generator 204 to return the time base generator therein to its reference condition. This event causes the integrator control circuit 206 to act on the time-controlled integrator 190 so as to return the holding level of output thereof to the reference state as has been described previously with reference to FIG. 5. When the object advances somewhat beyond the reset position, the start position sensor 202 acts through relay circuit and time base generator 204 to start the generation of the time base, typically in the form of a ramp or sawtooth of voltage or current. The integrator control circuit 206 senses when this ramp voltage has risen to a predetermined level, and at that time turns on the integrator 190 as shown for example at $t_3$ of FIG. 5. When after a predetermined time the time base generator output has risen to a higher predetermined level, the integrator control circuit 206 acts on integrator 190 to arrest the integrating action and hold the output voltage of that integrator at the level which it is then achieved, at which holding level it remains until the next reset operation. The termination of integration corresponds to the time $t_4$ in FIG. 5, for example.

It is understood that the operations of the weight indicator 192 and of the actuator 196 may be sychronized with the attainment of the holding level by integrator 150 so that the actuator and the weight indicator respond to the output of integrator 190 at times when it represents the weight of the object being weighed.

The details of one specific embodiment for the mechanical balance arrangement and for the electrical circuitry will now be described with particular reference to FIGS. 7-12 hereof.

Figure 7:
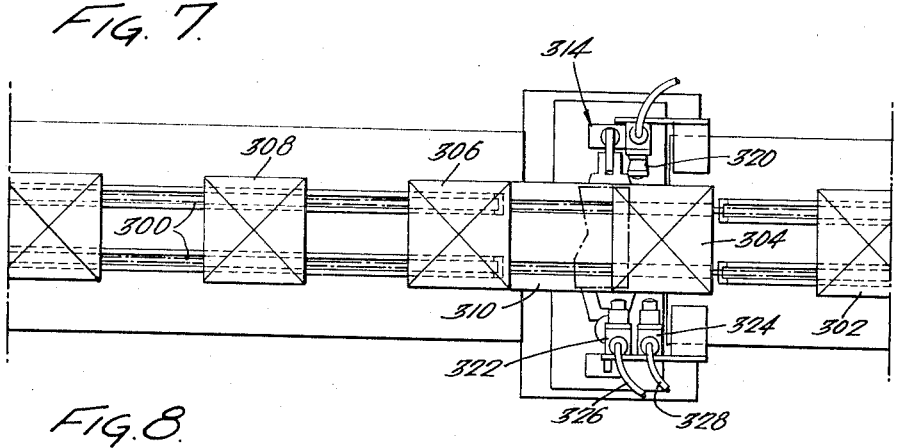
FIGS. 7 and 8 are plan and elevation views, respectively showing a preferred form of the mechanical arrangement of a system in accordance with the invention for weighing a train of rapidly-moving objects.
Figure 8:
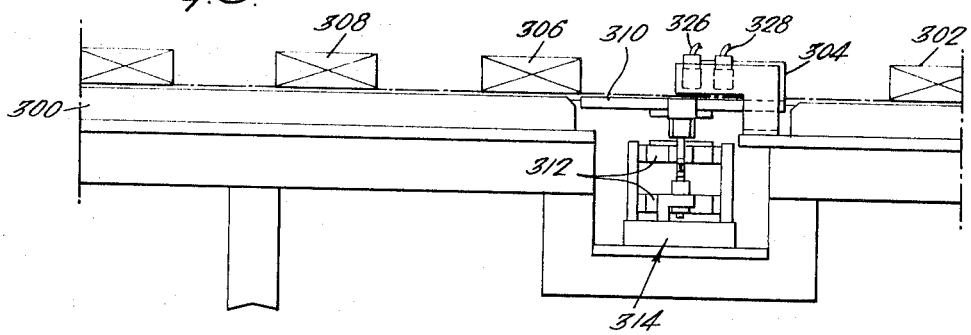

Referring now particularly to FIGS. 7-11 showing the mechanical arrangement of one specific embodiment of the mechanical portions of a weighing system for use in the present invention, a conveyor in the form of a pair of parallel motor-driven chains 300 delivers a train of objects such as 302, 304, 306 and 308 in succession into a weighing position on the horizontal platform 310, object 304 being shown in a weighing position in FIG. 7. The objects are moving continuously at a high speed from left to right in FIG. 7, and are weighed consecutively as they move across the platform. Platform 310 is supported by, but off the rotational axis of, the beam balance means 312 of the beam balance structure 314, the details of which will be described hereinafter. The platform 310 is pivotally mounted on the supporting balance beam means so that when the balance beam means rotates through small angles the platform remains horizontal and moves substantially only along the vertical direction. As will be described more fully, the beam balance means is torsionally restrained about its balance axis so that the beam balance means, the platform, and the objects thereon, constitute a mechanically resonant system, the platform vibrating up and down as the beam balance means oscillates to and fro about its balance axis. In this example, the beam balance means oscillates transversely of the direction of the motion of the objects to be weighed so that the axis of rotation of the balance means is also along the direction of object motion, although this axis may be oriented in other horizontal directions if desired.

To detect the arrival of the object to be weighed at two positions along the platform 310, there are provided position sensing means in the form of a light source 320 along one edge of the conveyor which directs light toward a pair of photocell devices 322 and 324 spaced apart along the opposite edge of the conveyor. In the absence of an object on the platform, both photocells are illuminated by the light source 320. When the leading edge of an object is moved sufficiently onto the platform 310 to prevent light from reaching photocell device 322 from lamp 320, an electrical reset signal indicative of this light blockage is produced over line 326, and when the object is moved further so as to block passage of light to photocell device 324 a corresponding "start time base" signal is produced over line 328. Devices suitable for these purposes are well known in the art and need not be described in detail.

Referring now to FIGS. 10 and 11 for a more detailed description of the beam balance structure, a fixed base 330 is provided with a pair of upright opposed support arms 332 and 334. An upper centrally-apertured, yoke-like, upper balance arm 336 is spring supported between the arms 332 and 334 by means of a pair of opposed, coaxial, torsionally-resilient, spring-pivot means 338 and 340, one end of each spring-pivot means being secured to balance arm 336 and the other end secured to the corresponding one of the support arms 332 and 334. Such spring-pivot devices are well known in the art and commercially available in a variety of sizes and types, and typically employ a crossed leaf-spring arrangement to provide relatively high beam strength but substantial spring compliance. The pivot means 338 and 340 are so oriented about their common axis that the leaf springs thereof are unstressed when the balance arm 336 is horizontal.

A lower balance arm 344 of substantially the same size and shape as the upper balance arm 336 is mounted in a position aligned with the upper balance arm by means of another pair of opposed, coaxial, torsionally-resilient spring-pivot means such as 346, the latter pair of pivot means being of the same type and similarly disposed as the upper pair of pivot means 338 and 340.

The upper and lower balance arms 336 and 344 are tied together at their opposite ends by a pair of opposite end bars 350 and 352. Each of the end bars extends, at its upper and lower ends, through an open-yoke end portion of the upper an lower balance arms. End bar 352 is tied to the upper and lower balance arms by torsionally-resilient spring pivot means 356 and 358 respectively, while end bar 350 is tied to the upper and lower balance arms by the torsionally-resilient spring-pivot means 360 and 362. The spring pivot means 356, 358, 360 and 362 may all be identical to each other and of the same class as the previously described pivot means such as 346, except that each is a three-section device so that both of the opposite ends may be held fixedly in its corresponding balance arm. Such three-part devices are also well known in the art and commercially available. The angular positions of these four spring-pivot means are preferably also such that the spring elements thereof are substantially unstressed when the upper and lower balance arms are substantially horizontal.

The assembly of the upper and lower balance arms and of the end bars provides a parallelogram structure such that when this structure is tilted in either sense about the balance axis, the end bars 350 and 352 move substantially only along the vertical direction, at least for the small angles of beam rotation which are utilized, and in any event the end bars remain in vertical positions during duch beam tilting.

The platform 310, with the chain-receiving grooves 365 formed therein, is mounted on a platform-supporting bar 366. The latter bar is mounted vertically by means of an upper spring pivot 370 and a lower spring pivot 372. With this arrangement, the platform supporting bar 366 will move up and down and remain vertically oriented when the beam members tilt. The point of support of the platform structure, however, is displaced somewhat to the right of the centers of the beam-supporting spring pivots to provide a short moment arm, designated hereinbefore as $L_1$, so that the weight of the platform and its mounting structure exerts a clockwise torque or moement on the beam balance arms.

More particularly the torsionally-resilient spring-pivot means 370 and 372 are of the three-part type, similar to the pivots 356 and 358. The center section of each of the pivots 370 and 372 is secured to the platform-supporting bar 366, and the opposite ends of the spring pivot 370 are fixed in opposite, downwardly-depending portions 380 and 382 of a flanged cross-member 384 secured by its flanged regions to the opposite sides of the upper balance beam member and extending across the central aperture therein. A similar cross-member 386 extending between the opposite sides of the lower balance beam member 344 mounts the lower spring pivot means 372 in a similar manner.

A counterweight 390 is secured to the upper end of the end bar 350, the weight of which can be selected to produce balancing of the beam balance means as desired. Where the objects to be weighed are completely random in weight and differ greatly among themselves, the counterweight may be adjusted so as to exactly balance the beam means with no object on the platform. However, even in the latter case the counterweight may be selected somewhat heavier so as to produce at least some reduction in the unbalanced state of the beam means during weighing, and thus reduce its susceptibility to interference from vibrations transmitted through the support. In the present specific example, it will be assumed that the apparatus is to be used to weigh a train of objects each having a nominal or standard weight of 1 pound and expected to deviate from this weight by only a relatively small amount. In such case it is preferred to use a counterweight 390 which exactly balances the system when a standard one pound weight is placed on the platform. This accomplishes substantial balancing of the beam means during each weighing as desired to minimize the effects of interfering vibrations. Where a chain or other delivery means for moving the object over the platform exerts appreciable weight on the platform, its weight may be considered as a part of the platform weight and compensated for also by the counterweight.

The structure thus far described constitutes in effect a torsional weighing balance which in its static state is displaced angularly in proportion to the magnitude of the weight on the platform. Spring restraint about the balance axis is provided by the combined effects of the several spring pivot means described above; while a number of these spring pivots are displaced horizontally from the balance axis, the spring effect is transmitted through the various connecting members so as to provide a restoring torque about the balance axis, and the effect of the combination of these elements is equivalent to a single spring means located at the balance axis.

Because of the above-described operation of the end bars and of the platform support bar, the platform and the end bars move up and down without tilting when the beam balance oscillates. Also, for the small angles typically utilized (for example less than 1° or 2°) the vertical movement of the platform, of the beam balance means and specifically of the end bars 350 and 352, is substantially exactly proportional to the angular displacement of the beam. The angle of displacement in this example is in fact limited to such small angles by the pair of stops 390 and 392 extending upward from base 330 adjacent the lower end of the two end bars 350 and 352. These stops also prevent damage to the various spring pivot means which might occur if the beam were permitted to turn through large angles.

While the vertical oscillatory motion may be sensed at a variety of positions in the structure and by a variety of different known means, in this example signals representing the vertical displacement are obtained as follows.

End bar 352 is provided with a pair of oppositely-extending horizontal arms 400 and 402. Arm 400 is secured to the movable member 404 of the displacement sensor 406, the stator element 408 of which is mounted from the base plate 330 by a suitable clamp arrangement 410. The zero position of the movable member 404 is adjustable to a desired fixed vertical position by means of the lock nut 412. Displacement sensor 406 may comprise any of a variety of well-known commercial devices which produce zero output signal in a reference position of a movable member, and a proportionately increasing output signal of positive sign for one direction of displacement of the movable member and of negative sign for the opposite direction of motion.

Arm 402 is connected to the movable member 414 of the velocity sensor 416, the zero position of the movable member being settable by means of the lock nut 418. The stator 420 for the velocity sensor 416 is mounted from the bar 330 in a suitable clamp bracket 422. Such devices for producing an output signal proportional to the magnitude and sign of the linear velocity of the movable member are well known in the art and commerically available, typically comprising a magnet moved relative to a coil to induce a voltage proportional to the relative velocity.

The left end bar 350 is provided with two horizontally extending arms 430 and 432 arranged similarly to arms 400 and 402, and connected to operate the arms of displacement sensor 434 and velocity sensor 436 respectively, the entire arrangement being in effect the mirror image of the corresponding arrangement at the right end of the beam structure.

Since the movable arms of the sensors of the left-hand pair 434 and 436 move by signal amounts but in opposite directions with respect to the motions of the movable arms of the right-hand pair of sensors 406 and 416, the signals produced by the two displacement sensors in response to tilting of the beam structure are equal but opposite to each other in sign, as are the signals from the velocity sensors. Further, the horizontal distance from the pivots for the two opposite end bars to the axis of balance of the beam structure is the same for both end bars, and corresponds to the dimension hereinbefore designated as $L_2$. Since the sensors in each case are connected to one of the end bars, for the small angles employed the vertical displacements and velocities sensed by the sensors are $L_2$ times the corresponding angular displacements and velocities.

It is noted that the moment arm $L_1$ for the weight of the platform is short compared with the horizontal distance of the axis of the end arms 350 and 352 from the axis of balance. We have found this articularly advantageous in that the short moment arm for the weight of the platform tends to eliminate any substantial changes in the natural frequency of vibration of the resonant mechanical system for different weights of the platform or the platform plus object to be weighed, while at the same time providing relatively large vertical displacement at the ends of the beam to operate the four sensors.

Considering now the preferred form of the electrical portion of the system in accordance with the invention as shown particularly in FIG. 12, the displacement sensors 406 and 434 are connected differentially through input resistors 500 and 504 to produce the difference signal $-2ax$ at the inverting input terminal 508 of the operational amplifier 510. An adjustable negative bias voltage is also applied to the inverting input terminal 508 from the adjustable tap 514 of the adjustable voltage divider 516, supplied at its upper end with a negative bias voltage $-V_1$ with respect to its other grounded terminal. An adjustable feedback from the output of amplifier 510 to the inverting input terminal 508 thereof is provided by way of the series resistor 522 and the adjustable tap 524 on the voltage divider 526 connected between the output terminal of the amplifier and ground. The latter adjustable tap controls the coefficient or proportionality factor of the signal at the output of the amplifier, by changing the effective gain of the amplifier. The adjustable tap 514, in effect, changes the DC level of the signal. Tap 524 is adjusted so that the coefficient of $x$ is equal to $K/L_2$, and tap 514 is adjusted to provide a constant negative term of a magnitude $-L_1S$. The signal on the output line 530 from amplifier 510 therefore represents the term $(K/L_2)x - L_1S$ in equation (7) hereinbefore.

An advantage of the circuit of FIG. 12 is that the signal on line 530 can be adjusted to correspond to the values $K/L_2$ and of $-L_1S$ without requiring measurement or calculation of the value of the spring constant K, and without requiring separate measurement of the signals supplied to and produced by the amplifier 510.

Thus, referring to equation (7) hereof, when the platform is at rest in its equilibrium condition there is no velocity or acceleration and all those terms in equation (7) which include velocity or acceleration become zero. In this equilibrium or static condition then, equation (7) becomes:

$$(K/L_2 x - L_1 S = -L_1 \Delta W_{R1}.$$

From the latter equation, it will be apparent that when $\Delta W_{R1}$ equals zero, $(K/L_2) x - L_1 S = 0$. (8)

Equation (8) shows that the voltage on line 530 should be zero when no object is on the weighing platform and the static equilibrium condition has been attained.

Accordingly, with no weight on the weighing platform, the taps 514 and 524 are adjusted to produce a zero output on line 530. This particular adjustment may not be the correct one, since an incorrect value of $K/L_2x$ could be balanced by an incorrect value of $-L_1S$. However, it is also noted that in the equilibrium condition a weight of the standard value $S$ placed on the platform should cause $Kx/L_2$ to be zero, and thereby cause the expression $(Kx/L_2 - L_1S$, a known number. For example, if the calibrating weight is one pound and the distance $L_1$ is three-fourth of an inch, than with a one-pound calibrating weight on the platform, the voltage on line 530 should be -.75.

Accordingly, taps 514 and 524 should be adjusted to provide the above-specified output weight indication of $-L_1S$, by first adjusting the tap 514. This latter condition can also be produced by an incorrect pair of values for the terms in the expression $Kx/L_2 - L_1S$, but when the two voltage divider taps are so adjusted that the proper output is obtained both for zero weight on the platform and for the standard weight $S$ on the platform, then the adjustment is correct. While a few alternate readjustments of the taps may initially be necessary, in general the correct calibration adjustment will be obtained promptly.

The signal on line 530 is applied to one input of the high-gain summing integrator 542, which may be of known standard form; in this example it comprises an operational amplifier stage 544 one input terminal 546 of which is grounded and the other input terminal 548 of which is connected to the output of the amplifier stage by the integrating capacitor 550. The signal on line 530 is supplied through an input resistor 552 to the amplifier input terminal 548.

The impedance 558 represents the source of velocity signals from stator 420 of the right-hand velocity sensor, while the impedance 560 represents the source of signals from the stator 436 of the left-hand velocity sensor. These velocity signals, represented as $b\dot{x}_r$ and $b\dot{x}_l$ respectively, are connected differentially to form a signal $2b\dot{x}$ which is supplied through a resistor 564 to the inverting input terminal 566 of operational amplifier 568. The inverting terminal 566 of amplifier 568 is also provided with a gain control circuit comprising the resistor 572 connected between the output terminal of the amplifier and ground, a variable tap 574 on that resistor, and a series resistor 576 connecting the tap to the input terminal 566. The non-inverting input terminal 570 is grounded. The signal represented as $2b\dot{x}$ at the input to amplifier 568 is thus converted to the signal $-e\dot{x}$ on amplifier output lead 580, the value of $e$ depending upon the position of the tap 574.

The signal on lead 580 is applied by way of the adjustable voltage divider 581 to the inverting input terminal 582 of the operational amplifier 584, the non-inverting input terminal 586 of which is grounded. The output of amplifier 584 then represents the quantity $\dot{x}R/L_2$, which is also supplied to the inverting input terminal of the operational amplifier 544 in the integrator 542, in this case by way of the series input resistor 590. The adjustable voltage divider 581 enables adjustment of the scaling factor or coefficient for the term $\dot{x}$ to the value $R/L_2$.

The signal at the output of amplifier 568 is also supplied to a differentiating amplifier circuit comprising an operational amplifier 596 having its non-inverting input terminal grounded, and having a resistor 598 and a capacitor 600 connected in parallel with each other between the output of the amplifier and the inverting input terminal thereof, and having a series resistor 602 and a series capacitor 604 connected between its inverting input terminal and the output line from amplifier 568. The differentiating action is provided by resistor 598 and capacitor 604; a degree of integrating action is provided, in this embodiment, by resistor 602 and capacitor 600 to reduce the effects of interfering noise on the circuit.

The output of amplifier 596 is adjusted to provide the value $\ddot{x}I_1/L_2$ by adjustment of the tap 574 associated with amplifier 568. After such adjustment has been made, the voltage divider 581 may be adjusted to provide the proper output from amplifier 584. The signal on output lead 610 of amplifier 596 is supplied through an input resistor 612 to the inverting input terminal 548 of integrator amplifier 544.

The signal on lead 610 is also passed through the signal multiplier 614 to the adjustable voltage divider 616 to produce at its variable tap 618 the signal $(L_1^2/gL_2)$ $\ddot{x} \Delta W_{R1}$, the latter signal being supplied to integrator 542 by way of the input series resistor 620 connected to the inverting input terminal 548 of amplifier 544. It is noted that multiplier 614 is also supplied with a signal representative of $\Delta W_{R1}$ from the output of amplifier 544, so as to produce the above-described signal at the tap 618 of divider 616.

The output line 621 of amplifier 544 in the integrator 542 is connected to the inverting input terminal of the same amplifier by way of the resistor 626; it is a characteristic of an integrator of the type shown that the gain accorded a given input thereto is in inverse proportion to the magnitude of the input series resistor through which it is supplied, and all of the input resistors except for 626 have the same value while the value of resistor 626 is $1/L_1$ times this standard value; these relative values of the five input resistors are indicated by the numbers (1), (1), (1), (1) and $1/L_1$ in the figures. Accordingly, the five signals supplied through the input resistors to the point 548 in integrator 542 are in such proportions that their sum should equal zero to satisfy equation (7) above.

It has already been described above how the signal on lead 530 may be adjusted properly. The signal fed back through resistor 626 of integrator 542 is readily provided with the proper magnitude, since the moment arm $L_1$ may be accurately measured and the value of resistor 626 selected accordingly. Similarly, the scaling factor $L_1^2/gL_2$ for the $\ddot{x}$ signal supplied to resistor 620 may be readily provided by adjustment of tap 618, since $L_1$, $L_2$ and $g$ are all easily ascertainable. It then remains only to adjust the scaling factors or coefficients for the two other signals applied to the resistors 590 and 612. While these also can be adjusted be measuring the values of the constants involved in each expression and adjusting the various gain controls accordingly, the proper adjustment can be obtained without requiring such measurements, as follows: (1) adjust the tap 574 on the divider 572, and adjust tap 579 on divider 581 to produce a null output indication on a cathode-ray oscilloscope connected to lead 650, with zero weight on the platform and the platform vibrating; next, produce a similar null outout indication on the oscilloscope by adjusting tap 618 on divider 616 with the standard calibrating weight on the platform and the platform vibrating.

The weight-representing signal on output lead 650 is supplied, throug a series input resistor 652, to the input of a commercially-available type of three-mode integrator 656. Integrator 656 has a hold mode in which the output voltage on its output lead 658 is held constant, a reset mode in which this voltage is held at zero or some other reference voltage, and an integrating mode in which the output voltage increases linearly at a rate proportional to the magnitude of the input current supplied through resistor 652. The mode in which integrator 656 is operating is determined by the combination of open or closed positions of the two comparator relay switches 660 and 662. When both of the latter switches are open as shown in the drawing, the charge on the integrating capacitor 666 remains virtually constant, and therefore the output voltage is also constant. When relay switches 660 and 662 are both closed, the reset mode is established in which the charge on capcitor 666 is rapidly dissipated and the output voltage is returned to zero. When switch 660 is open but 662 closed, the linear integrating action occurs.

More particularly, three-mode integrator 656 includes an operational amplifier 700 having its non-inverting terminal grounded and its output terminal connected through a stabilizing capacitor 703 to the inverting input terminal of the amplifier. The inverting input terminal of amplifier 700 is connected to the variable tap 704 on the initial-condition bias supply voltage divider 706, by way of series resistor 708, current driver amplifier 722 and comparator relay switch 660. Capacitor 666 is connected between the inverting input terminal of amplifier 700 and the junction point 720 between resistors 712 and 710, the latter two resistors 710 and 712 being connected in series between junction points 720 and 726. The current-driver amplifier 722 is connected between switch contact 724 of relay switch 660 and the junction point 726 between resistor 708 and 710. Input resistor 652 is connected to ground through a pair of oppositely-poled, parallel, diode rectifiers 730 which serve the protective function of preventing the input voltage from exceding a relatively small value in either sense. A resistor 732 connected between junction point 726 and ground also serves in determining an appropriate DC level for operation of amplifier 722.

The position of relay comparator switch 660 is determined by the relay comparator device 740, and the position of relay comparator switch 662 is determined by the relay comparator deivce 742. One input line 745 to device 740 is at a DC voltage determined by the position of a variable tap 746 on a voltage divider 748, while the corresponding input lead 749 of device 742 has a DC voltage thereon determined by the position of the variable tap 750 on the voltage divider device 752. The voltage on the other input line to each of the devices 740 and 742 is the voltage on the output line 760 of the time base generator.

The time base generator 762 comprises an operational amplifier 780, the non-inverting input terminal of which is grounded. The inverting input terminal thereof is connected through the capacitor 782 to the output line 760 of the amplifier. A positive voltage is also supplied to the inverting input terminal of amplifier 780 from the adjustable tap 784 on the voltage divider 786, by way of the resistor 787 and the relay contacts 788 when they are closed. A conventional protective circuit 790 in the form of a pair of oppositely-poled, parallel, diode rectifiers is connected between ground and the end of resistor 787 remote from tap 784. A small-valued resistor 794 is connected between amplifier output lead 760 and the inverting input terminal of amplifier 780 by way of the relay contacts 800 when they are closed.

In the condition of the relay contact shown in the drawing, if capacitor 782 is initially uncharged, it will charge linearly to a saturation level to produce on output lead 760 the type of voltage waveform shown in FIG. 13A, wherein ordinates represent output voltage on line 760 and abscissae represent time.

When the contacts 788 and 800 are switched to their other alternate positions, however, the positive biasing voltage for the inverting input terminal of amplifier 780 is removed therefrom, and the low-valued resistor 794 is connected in parallel with capacitor 782 to discharge it rapidly to its original uncharged condition. This cycle of operation is repeated for each cycle of operation of the relay contacts.

The condition of these relay contacts 788 and 800 is in turn controlled by the coil R of the relay of which they are a part. When the coil of relay R is not conducting current the contacts will be in the position shown, while when relay coil R is conducting the contacts will switch to their opposite condition.

The photocell and relay circuit 820 provides the necessary control of the current through the relay R. The phototransistor $P_R$ represents the reset photocell device previously described as positioned along one side of the object conveyor, while the phototransistor $P_S$ represents the "start time-base" photocell device positioned slightly downstream from the reset photocell device. Circuit 820 includes the operational amplifier 822 which produces condition through relay coil R only when a voltage at the non-inverting input terminal 826 of the amplifier is negative with respect to the voltage at the inverting input terminal 828 thereof, thereby to cause the output terminal of the amplifier to go negative with respect to ground. The diode rectifier 830 then becomes unblocked to permit conduction through the relay coil. The combination of resistor 832 and diode rectifier 834 in parallel with the relay coil provide conventional anti-chatter action. The parallel combination of oppositely-poled diode rectifiers 836 connected between the two input terminals to amplifier 822 provide a protective function by limiting the maximum voltage which can appear between these terminals. Resistors 838 and 839 provide a voltage divider between the output of amplifier 822 and ground, the junction point between these resistors being connected to amplifier input terminal 826.

The reset phototransistor $P_R$ is connected in series with diode rectifier 850 between ground and the junction 851 between resistors 842 and 844. The "start time-base" phototransistor $P_S$ is connected in series with resistor 852 between a positive bias source 853 and the junction of resistors 841 and 842.

When both phototransistors $P_S$ and $P_R$ are illuminated, as will be the case when no object is on the weighing platform, they present a very low resistance to current flow. The resistors 852 and 841 and the positive and negative bias source 840 and 853 are so proportioned that, under these conditions, the voltage applied to resistor 842 is positive; diode 850 and phototransistor $P_R$ then maintain the junction 851 at a voltage only slightly above ground, and this voltage, when further divided down by resistors 844 aNd 846, is not sufficiently positive to unblock rectifier 830 and there is no current through relay coil R.

When the object to be weighed advances to the position which blocks light to reset photocell $P_R$, $P_R$ exhibits a very high resistance and the voltage at the junction between resistor 851 increases abruptly to a much higher positive value since it is no longer held near ground potential by $P_R$. As a result, the voltage at input terminal 828 of amplifier 822 becomes sufficient to unblock diode rectifier 830, causing current through relay coil R and actuation of contacts 788 and 800 to their opposite conditions so that the time-base capacitor 782 is discharged.

Shortly thereafter, when the object to be weighed moves to the point where the "start time-base" photocell $P_S$ is blocked, both $P_R$ and $P_S$ will be momentarily blocked. Since both $P_r$ and $P_S$ then exhibit very high resistances, the negative voltage from negative bias terminal 840 causes amplifier input terminal 828 to become strongly negative, whereupon diode rectifier 830 is again blocked, current in relay coil R cut off, and the contacts 788 and 800 returned to the position shown in the drawing. This causes the initiation of the recharging of capacitor 782 and therefore the initiation of the ramp or sawtooth of voltage. When the object to be weighed has moved somewhat further, the "start time-base" photocell $P_S$ will remain dark but the reset photocell $P_S$ will be illuminated. However, rectifier 850 will remain blocked because of the negative potential at the junction 851 between resistors 842 and 844, and a relatively strong negative potential will continue to be applied to amplifier input terminal 828. A short time later, the object will move so that both phototransistors are illuminated, in which case the voltage at amplifier input terminal 828 reverts to the very small positive value described previously for the original conditions existing before the object blocked either phototransistors photocell.

Accordingly, it will be appreciated that the relay contacts 788 and 800 remain in the position shown in the drawing except during the interval when only the reset photocell is blocked. The resultant sawtooth operation is represented in FIG. 13A. At the beginning of the graph the voltage has a high saturation level remaining from the previous cycle of operation. When the reset photocell only is blocked (during the interval designated R), the time base voltage is held at zero. At the end of the time interval R, when the "start time-base" photocell becomes blocked, the ramp portion of the curve begins and extends upwardly in a linear fashion until the time-base circuit becomes saturated at a predetermined fixed saturation level. This cycle repeats itself under the control of the relay circuit 820.

The effects of this time-base voltage on the integrator circuit 656 will be appreciated by comparing FIG. 13B with FIG. 13A, in which ordinates represent the output voltage at 658 representing the weight of the object, while abscissae represent time. At the beginning of the graph of FIG. 13B there is shown a voltage level designated "last W" representing the holding level for the weight of the previous object, and at this time the switches 660 and 662 are in the open condition shown in the figure. When the time-base reset interval R begins (FIG. 13A), the zero time-base voltage applied over lead 760 to both of the relay comparators 740 and 742 causes both of the relay switches 660 and 662 to close. Under these conditions, the feedback path from outpath oautput of amplifier 700 it its inverting input terminal by way of resistor 710 and current driver amplifier 722 is completed, and the action of this circuit is to discharge storage capacitor 666 immediately to a zero reference voltage level, as shown in FIG. 13B. As the ramp voltage shown in FIG. 13A increases, the point I will be reached at which the ramp voltage is substantially equal to the voltage supplied to the other input terminal of comparator device 740 from bias tap 746. When this occurs, device 740 causes its relay switch 660 to open, permitting capacitor 666 to charge linearly at a rate determined by the magnitude of the input voltage supplied through resistor 652. This initiates the integration time for integrator 656, as shown in FIG. 13B. After a further predetermined time, the time-base voltage will rise to the value H in FIG. 13A at which it becomes equal to the bias voltage supplied to comparator device 742 from bias tap 750. Device 742 responds by opening its relay switch 662, so that now both relay switches are open and capacitor 666 is isolated in the holding condition to maintain its then-existing voltage constant, as shown in FIG. 13B. This holding level represents the weight of the object being weighed. By adjustment of the bias taps 746 and 750, the "start integration" and "start hold" points I and H in FIG. 13A can readily be adjusted to provide an integration time such that the holding level of voltage is numerically equal to the weight-representing input voltage supplied through resistor 652, as shown for example in FIG. 5 hereof.

Figure 9:
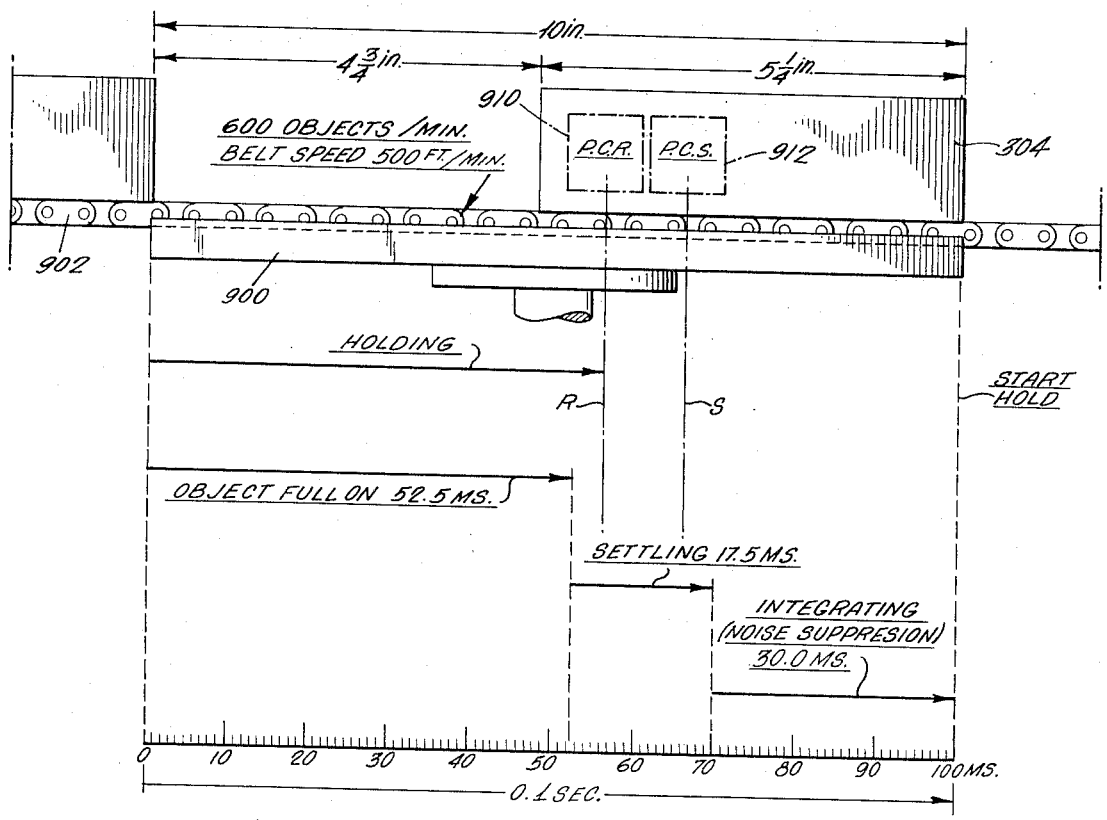
FIG. 9 is a diagram to which reference will be made in explaining the timing of operations in the system of FIG. 7.

Referring now to FIG. 9, typical timing conditions are shown for one particular application of the invention. The case is shown in which the weighing platform 900 is 10 inches long, and used to weigh objects 5¼ inches long and spaced apart from each other by 4¾ inch, so that one object just begins to leave the platform when the next object begins to arrive at the platform. With a speed for the conveyor belt 902 of about 500 feet per minute, 600 objects per minute will pass over the weighing platform and be weighed in sequence. The reset photocell 910 is positioned downstream on the platform by slightly more than the length of each object, so that each object is fully on the weighing platform before the reset photocell is operated. In this example, the total time of transit of the leading edge of an object over the platform is 0.1 second, and in 52.5 milliseconds it will move from just off the platform to completely on it. After the reset photocell has been actuated, the object continues to move forward until the "start time-base" photocell 912 is actuated to start the time-base generator. Shortly after that (in this example about 70 milliseconds after the object first comes on to the platform) the noise suppression integration begins, and continues for about 30 milliseconds, at which time the holding operation starts and the object begins to leave the platform. It is noted that between the time when the object is fully on the platform and the time when integration and output indications of weight begin, there is an intervening settling interval (in this example about 17.5 milliseconds in duration) allowing for mechanical and electrical settling of the equipment after the object is fully on the platform.

Although not necessarily, it is advantageous to arrange the objects with a spacing such that one object begins to leave the platform just as another comes on, since in that case the weight on the platform remains nearly constant at all times for objects of about the same weight, and there is therefore less transient disturbance of the platform between the weighing of successive objects.

It will be understood that various standard and well-known expedients and details of the weighing system have not been shown in detail, since they are well known in the art and would render the disclosure less clear. As examples only, it will be understood that the various amplifier devices and logic elements in the system will have various supply leads and conventional connections in addition to those shown, and that the base 330 in FIG. 11, for example, will normally be mounted with respect to mechanical grounds on appropriate resilient shock mounts.

It has been found that a system constructed in accordance with the general teachings disclosed with respect to FIGS. 9–13 is capable of weighing objects at a rate in excess of a thousand objects per minute with an accuracy of about 1 percent.

While the invention has been des ribed with particular reference to specific embodiments thereof, it will be understood that it may be embodied in a variety of forms diverse from those specifically shown and described, without departing from the spirit and scope of the invention as defined by the appended claims.

What is claimed is:

1. Apparatus for weighing an object, comprising:
  spring-restrained support means for receiving an object to be weighed, whereby said support means is caused to execute a transient oscillatory motion in response to the addition of the weight of said object thereto;
  means responsive to said transient oscillatory motion for producing a first signal, a second signal, and a third signal, respectively representative of the displacement of said support means, of the velocity of said support means, and of the acceleration of said support means during said transient oscillatory motion thereof; and
  computing means responsive to said first, second and third signals for solving the second-order differential equation of motion of a vibrating damped system for said support means to produce an output signal representative of said weight of said object.

2. Apparatus in accordance with claim 1, in which said computing means is operative to produce said output signal in response to the values of said first, second and third signals occuring during a period of time less than the time of one cycle of said oscillatory motion.

3. Apparatus in accordance with claim 1, comprising spring means restraining the motion of said support means and having characteristics such that its deflection during said period is within its elastic limits.

4. Apparatus in accordance with claim 1, comprising spring means for restraining motion of said support means, said spring means comprising torsionally-resilient means responsive to said addition of said weight to deflect said spring means torsionally in a manner dependent upon the magnitude of said weight.

5. Apparatus in accordance with claim 4, in which said spring means is torsionally-resilient about a horizontal axis, and said support means comprises a balance beam restrained by said spring means and platform means supported on said balance beam at a point spaced from said axis.

6. Apparatus in accordance with claim 5, comprising counterweight means for counteracting the moment produced on said beam by said platform means.

7. Apparatus in accordance with claim 6, in which said object has a expected weight approximating a known standard value and said counterweight causes said beam to be balanced and said spring means unstressed when a weight having said standard value is on said platform means.

8. Apparatus in accordance with claim 1, comprising integrating means supplied with said output signal for discriminating against interference signal components present therein.

9. Apparatus in accordance with claim 1, comprising indicator means responsive to said output signals for producing visual indications of the value of said weight.

10. Apparatus in accordance with claim 1, comprising actuator means and level sensing means responsive to said output signal for actuating said actuator means when said output signal has a value in a predetermined range.

11. Apparatus in accordance with claim 1, comprising means for moving a plurality of objects to be weighed in succession onto said support means, whereby said output signal represents successively the weights of said objects.

12. Apparatus accordingly to claim 11, comprising means for sensing the times of arrival of said objects at a weighing position on said support means, and means for sampling said output signal for times shorter than the intervals between said times of arrival of said objects at said weighing position.

13. Apparatus in accordance with claim 1, in which said equation is of the form $$(M + M_0)(d^2x/dt) + R(dx/dt) + Kx + (M + M_0)g = 0$$

where $M$ is the mass of said object, $M_0$ is the effective mass of said spring-mounted support means exclusive of the mass of said object, $R$ is the damping factor for said spring-mounted support means, $K$ is the spring-constant for said spring-mounted support, $g$ is the acceleration of gravity, and $x$ is the instantaneous value of the displacement of said support means produced by the weight of said object.

14. High-speed weighing apparatus comprising:

support means for receiving, at a weighing position thereon, objects to be weighed in sequence;

spring means restraining said support means so that each object, when at said weighing position, moves said support means in an initial transient oscillatory motion characteristic of the weight of said object;

means for automatically moving said objects into said weighing position in sequence;

means responsive to the weight added to said support means by each of said objects for producing a first signal, a second signal and a third signal respectively representative of the displacement, of the velocity, and of the acceleration of said support means during said initial transient oscillatory motion produced by said object; and computing means responsive to said first, second and third signals for solving the second-order differential equation of motion of a vibrating damped system for said support means to produce an output signal, for each of said objects, representative of the weight of each said object.

15. Apparatus in accordance with claim 14, comprising means for moving a series of said objects successively on to said support means, at least some of said objects being moved onto said support means before said oscillatory motion due to the preceding object has died out.

16. Apparatus in accordance with claim 14, comprising a balance beam structure restrained against rotational motion about a horizontal axis by said spring means, said support means being mounted on said beam structure at a point spaced from said axis in a horizontal direction.

17. Apparatus in accordance with claim 16, in which said support means is mounted on said beam structure so as to move in proportion to the vertical component of motion of a point on said beam structure.

18. Apparatus in accordance with claim 16, comprising motion sensor means responsive to vertical motion of points on opposite sides of the balance point of said beam to produce separate signals, and means for combining said signals differentially to cancel signals produced by similar motions of portions of the beam on opposite sides of said balance point.

19. Apparatus in accordance with claim 16, comprising counterweight means supported on said beam structure on the opposite side from said support means and having a weight to balance said beam structure when a predetermined standard weight within the expected range of weight of said objects is placed on said platform.

20. Apparatus in accordance with claim 16, in which said computer means comprises means responsive to said first signal, to said second signal and to said third signal for producing five separate signals respectively representative of the five quantities $A\ddot{x}$, $B\ddot{x}$, $\Delta W_{R1}$, $C\dot{x}$, $Dx$, $-SL_1$ and $L_1\Delta W_{R1}$ where $x$, $\dot{x}$ and $\ddot{x}$ represent respectively the instantaneous displacement, velocity and acceleration of said support means during said oscillatory motion, $\Delta W_{R1}$ is the weight of the object being weighed, $L_1$ is the horizontal distance by which said point is horizontally spaced from said axis, $S$ is the value of $\Delta W_{R1}$ for which said beam structure is balanced, and $A$, $B$, $C$ and $D$ are constants such that the sum of said five quantities equals zero, and high-gain summing integrator means supplied with said five separate signals for producing an output signal representative of the weight $\Delta W_{R1}$ of said object being weighed.

21. Apparatus in accordance with claim 20, in which said signal representative of $B\ddot{x} \Delta W_{R1}$ and said signal $L_1 \Delta W_{R1}$ are formed, respectively, by multiplying said output signal by $B\ddot{x}$ and by $L_1$.

22. Apparatus for the high-speed weighing of each of a train of moving objects, comprising:

a balance beam structure comprising a base, balance beam means, spring pivot means supporting said beam means on said base and providing substantially linear restoring torque on said beam means tending to maintain it horizontal when said beam means is rotated from a substantially horizontal position about an axis through said beam, platform means supported on said beam means so that its weight tends to rotated said beam means in one sense about said axis with said platform means remaining substantially horizontal, means for passing said objects in sequence over said platform means so that the weight of each object is supported on said platform means as it passes through a weighing position thereof, the resonant mechanical system comprising said beam means, said platform means and said spring means executing a transient oscillatory motion characteristic of the weight of each object when that object is in said weighing position;

means for producing a first signal proportional to the instantaneous vertical displacement of said platform, means for producing a second signal proportional to the instantaneous vertical velocity of said platform means, and means for producing a third signal proportional to the instantaneous acceleration of said platform means; and computing means responsive to said first, second and third signals for solving the second-order differential equation of motion of a vibrating damped system for said support means to produce an output signal representative of said weight of said object.

23. Apparatus in accordance with claim 22, in which said platform means is supported on said beam means at a first point spaced horizontally from said axis by a distance $L_1$, and said means for producing said first, second and third signals comprises means for sensing vertical motion of said beam means at a point spaced from said axis by a distance large compared with said distance $L_1$.

24. Apparatus for producing an output signal representative of the weight of an object supported in a mechanically-resonant system for which the equation of motion of said object is substantially in accordance with the following expression:

$$A\ddot{x} + B\ddot{x}\,\Delta W_{R1} + C\dot{x} + Dx - SL_1\,\Delta W_{R1} = 0$$

where $x$, $\dot{x}$ and $\ddot{x}$ are respectively the instantaneous displacement, velocity and acceleration of said object in said system, $A$, $B$, $C$ and $D$, $S$ and $L_1$ are known constants, and $\Delta W_{R1}$ is the weight of the object, comprising:

means for producing a first electrical quantity proportional to $A\ddot{x}$, means for producing a second electrical quantity proportional to $B\ddot{x}$, means for producing a third electrical quantity proportional to $C\dot{x}$, means for producing a fourth electrical quantity proportional to $Dx - SL_1$, and means for producing a fifth electrical quantity proportional to $L_1$;

means for producing a variable electrical quantity and for multiplying said variable electrical quantity by the values of said second and fifth electrical quantities to produce a sixth electrical quantity and a seventh electrical quantity;

means for additively combining said first, said third, said fourth, said sixth and said seventh electrical quantities;

means for automatically adjusting said variable electrical quantity until the additive combination of said first, third, fourth, sixth and seventh quantities is substantially zero; and means for utilizing said adjusted variable quantity as an indication of the weight of said object.

25. Apparatus in accordance with claim 24, in which said means for automatically adjusting said variable electrical quantity comprises a high-gain integrator.

* * * * *

UNITED STATES PATENT OFFICE
CERTIFICATE OF CORRECTION

Patent No. 3,800,893                    Dated April 2, 1974

Inventor(s) Joseph D. Ramsay and George R. Weaver

It is certified that error appears in the above-identified patent and that said Letters Patent are hereby corrected as shown below:

Column 9, line 48, "$L_2\ddot{\theta}$" should be --$L_2\dot{\theta}$--.
line 51, "pulse" should be --plus--.

Column 16, line 57, "signal" should be --equal--.
Column 17, line 8, "articularly" should be --particularly--.
Column 18, line 5, after "$(Kx/L_2 - L_1S$" there should be inserted --) to become --$L_1S$--.
Column 19, line 51, "be" should be --by--.
line 60, "outout" should be --output--.
line 65, "throug" should be --through--.
Column 21, line 65, "aNd" should be --and--.
Column 22, line 66, "outpath oautput" should be --the output--.
line 66, "it" should be --to--.
Column 23, line 62, "necessarily" should be --necessary--.
Column 28, line 2, expression "$A\ddot{x} + B\ddot{x}\Delta W_{R1} + C\dot{x} + Dx - SL_1\Delta W_{R1} = 0$" should be --$A\ddot{x} + B\ddot{x}\Delta W_{R1} + C\dot{x} + Dx - SL_1 + L_1\Delta W_{R1} = 0$--.

Signed and sealed this 17th day of September 1974.

(SEAL)
Attest:

McCOY M. GIBSON JR.                    C. MARSHALL DANN
Attesting Officer                      Commissioner of Patents